E. A. McKOY.
TURPENTINE CUP.
APPLICATION FILED JULY 10, 1907.

941,724.

Patented Nov. 30, 1909.

Witnesses
J. M. Fowler Jr.
S. L. Richmond

Inventor
Edwin A. McKoy,
By Mason Fenwick Lawrence,
Attorneys

UNITED STATES PATENT OFFICE.

EDWIN A. McKOY, OF NEW ORLEANS, LOUISIANA.

TURPENTINE-CUP.

941,724.  Specification of Letters Patent.  Patented Nov. 30, 1909.

Application filed July 10, 1907. Serial No. 383,087.

*To all whom it may concern:*

Be it known that I, EDWIN A. McKOY, a citizen of the United States, residing at New Orleans, in the parish of Orleans and State of Louisiana, have invented certain new and useful Improvements in Turpentine-Cups; and I do hereby declare the following to be a full, clear, and exact description of the invention, such as will enable others skilled in the art to which it appertains to make and use the same.

This invention relates to turpentine cups and has for an object to provide a device adapted to support a receptacle and serve to guide gum into such receptacle.

A further object of the invention is to provide an apron adapted to be inserted in a slit in the tree and provided with a wire extending along its lower horizontal edge having hooks at its opposite ends adapted to engage with members carried by the receptacle to support such receptacle.

With these and other objects in view, the invention comprises certain novel constructions, combinations and arrangements of parts, as will be hereinafter fully described and claimed.

Figure 1:
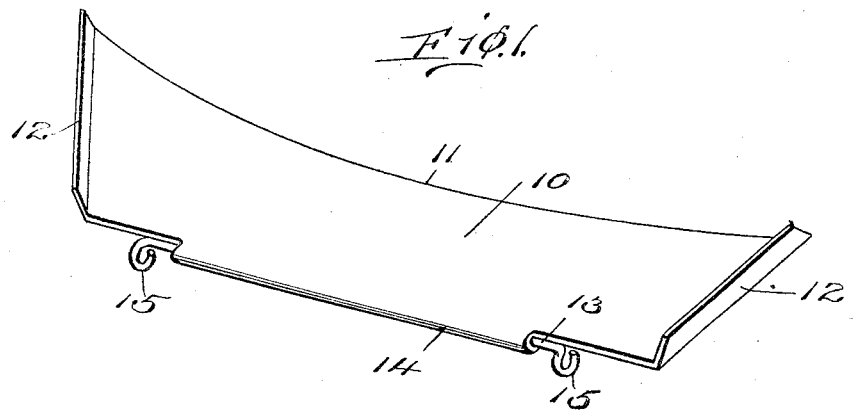
Figure 2:
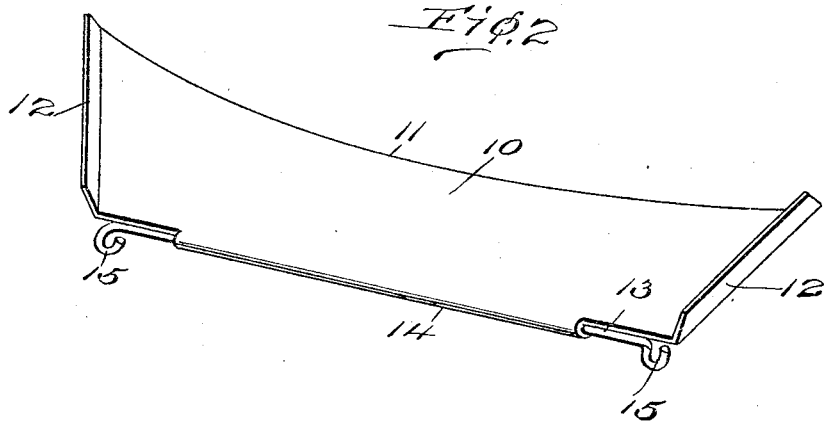

In the drawings:—Figure 1 is a perspective view of the improved apron. Fig. 2 is a perspective view of the improved apron showing the supporting member slightly longer than that shown in Fig. 1.

Like characters of reference designate corresponding parts throughout both views.

The improved apron which forms the subject-matter of this application is shown at 10 with a curved upper edge 11 adapted to be inserted in and to conform substantially to the curvature of the tree upon which the device is adapted to be operated. The apron is provided at opposite ends with upstanding flanges 12 converging toward the lower longitudinal edge and adapted to guide sap dripping upon the apron to a receptacle beneath. Along the lower longitudinal edge of the apron a wire 13 is secured in any approved manner here shown as by the lower edge of the apron being rolled as at 14 to embrace such wire and the opposite extremities of the wire are bent as shown at 15 to form backwardly extending upturned hooks. It will be noted in both figures that the roll 14 does not extend the entire length of the apron but the length of such roll 14 may, of course, be varied by making it longer or shorter as circumstances and conditions may dictate. As shown the roll is substantially two-thirds the length of the apron and in Fig. 1 the wire 13 is of such a length that the hooks 15 are disposed adjacent the extremities of the roll 14 while in Fig. 2 the wire is of such a length that the hooks 15 are adjacent the ends of the apron.

What I claim is:—

1. In a device of the class described, an apron comprising a body portion, a wire secured upon the under side of the apron and extending longitudinally thereof, and downwardly extending hooks formed upon the opposite ends of the wire.

2. In a device of the class described, an apron comprising a body portion, a wire extending longitudinally of the apron, and embraced by a portion thereof, and hooks formed upon the ends of the wire.

3. In a device of the class described, an apron comprising a body portion, a wire extending longitudinally of the apron along its lower longitudinal edge and embraced by a rolled portion of the lower edge of the apron, and hooks formed upon the opposite ends of the wire and extending downwardly from the apron.

In testimony whereof I affix my signature in presence of two witnesses.

EDWIN A. McKOY.

Witnesses:
JOHN L. FLETCHER,
L. L. MORRILL.